United States Patent
Cai et al.

(10) Patent No.: US 10,604,178 B2
(45) Date of Patent: Mar. 31, 2020

(54) CONTROL ASSEMBLY FOR POWER STEERING

(71) Applicant: China Automotive Systems, Inc., Wuhan (CN)

(72) Inventors: Haimian Cai, Ann Arbor, MI (US); Tianyi Qiu, Troy, MI (US); Shen Li, Sterling Heights, MI (US)

(*) Notice: Subject to any disclaimer, the term of this patent is extended or adjusted under 35 U.S.C. 154(b) by 189 days.

(21) Appl. No.: 15/903,906

(22) Filed: Feb. 23, 2018

(65) Prior Publication Data
US 2018/0237060 A1    Aug. 23, 2018

Related U.S. Application Data

(60) Provisional application No. 62/462,403, filed on Feb. 23, 2017.

(51) Int. Cl.
*B62D 5/083*     (2006.01)
*B62D 5/065*     (2006.01)
*B62D 6/08*      (2006.01)

(52) U.S. Cl.
CPC ............ *B62D 5/083* (2013.01); *B62D 5/065* (2013.01); *B62D 6/08* (2013.01)

(58) Field of Classification Search
CPC ....... Y10T 137/87249; Y10T 137/7839; Y10T 137/86662; Y10T 137/86638; B62D 5/083; B62D 5/0835; B62D 6/08; B62D 5/14
See application file for complete search history.

(56) References Cited

U.S. PATENT DOCUMENTS

| | | |
|---|---|---|
| 2,519,574 A | 8/1950 | Holl |
| 2,739,830 A | 3/1956 | Firth |
| 3,223,123 A | 12/1965 | Young |

(Continued)

FOREIGN PATENT DOCUMENTS

| | | |
|---|---|---|
| DE | 4138885 A1 | 6/1993 |
| EP | 0468659 A2 | 1/1992 |

(Continued)

OTHER PUBLICATIONS

International Search Report; Appl No. PCT/US2018/019509; dated May 14, 2018; 4 pages.

*Primary Examiner* — Jessica Cahill
(74) *Attorney, Agent, or Firm* — Dickinson Wright PLLC (57) ABSTRACT

A control assembly (20) for overcoming a rotational resistance required to activate supplementary steering force associated with conventional power steering systems. The control assembly (20) includes a shaft (26) subject to rotational resistance via a torsion bar (62). A valve assembly (22) has a first hydraulic circuit (76) that is interchangeable from an unassisted condition (36) to an assisted condition (34) for providing supplementary steering force to a steering gear after the rotational resistance of the torsion bar (22) is overcome by rotating the shaft (26). An actuator (38) includes a second hydraulic circuit (86) interchangeable from an unengaged condition (42) to an engaged condition (40) applying circumferential force on the shaft (26) to overcome the rotational resistance of the torsion bar (62) and rotate the shaft (26) from a non-rotated position thereby activating the supplementary force of the first hydraulic circuit (76).

19 Claims, 11 Drawing Sheets

(56) References Cited

U.S. PATENT DOCUMENTS

| | | | | |
|---|---|---|---|---|
| 3,360,932 | A | * | 1/1968 | Lech ............... B62D 5/097 |
| | | | | 60/386 |
| 3,404,704 | A | | 10/1968 | Adams |
| 4,169,515 | A | * | 10/1979 | Presley ............. B62D 5/14 |
| | | | | 180/429 |
| 4,194,531 | A | | 3/1980 | Bishop |
| 4,385,898 | A | | 5/1983 | Jordan |
| 4,428,399 | A | | 1/1984 | Masuda et al. |
| 4,454,801 | A | * | 6/1984 | Spann .............. B62D 5/083 |
| | | | | 137/625.24 |
| 4,469,342 | A | * | 9/1984 | Millard ............ B62D 5/083 |
| | | | | 137/625.24 |
| 4,516,471 | A | | 5/1985 | Duffy |
| 4,730,687 | A | | 3/1988 | Chikuma et al. |
| 4,819,545 | A | | 4/1989 | Dymond |
| 4,823,839 | A | | 4/1989 | Rayner |
| 4,905,782 | A | * | 3/1990 | Rieger ............. B62D 5/083 |
| | | | | 137/625.21 |
| 5,267,588 | A | | 12/1993 | Bishop et al. |
| 5,427,134 | A | | 6/1995 | Tiedman |
| 5,873,243 | A | * | 2/1999 | Uppal .............. B62D 5/097 |
| | | | | 418/61.3 |
| 2005/0268975 | A1 | | 12/2005 | Boecker |
| 2006/0021224 | A1 | | 2/2006 | Stoll et al. |
| 2006/0021820 | A1 | | 2/2006 | Heitzer |
| 2014/0271309 | A1 | | 9/2014 | Krahn et al. |

FOREIGN PATENT DOCUMENTS

| | | |
|---|---|---|
| EP | 1867553 A1 | 12/2007 |
| EP | 1867553 B1 | 8/2010 |
| GB | 2165502 A | 4/1986 |

* cited by examiner

CONTROL ASSEMBLY FOR POWER STEERING

CROSS REFERENCE TO RELATED APPLICATION

This U.S. Utility patent application claims the benefit of and priority to U.S. Provisional Patent Application Ser. No. 62/462,403 filed Feb. 23, 2017, the disclosure of which is incorporated herein by reference in its entirety.

BACKGROUND OF THE INVENTION

1. Field of the Invention

The present disclosure is generally related to a control assembly for power steering.

2. Related Art

This section provides background information related to the present disclosure which is not necessarily prior art.

Power steering or assist steering systems are implemented for reducing the amount of human effort required to turn the steering wheel of an automobile. Traditionally, these systems utilize hydraulic lines to add supplementary steering force to a steering gear by way of hydraulic fluid via a hydraulic pressure cylinder. This supplementary steering force is typically turned off and on by a control assembly that includes a shaft disposed within and rotatable relative to a valve sleeve. In these systems, the shaft extends between a torsion bar and a steering gear and conveys rotational movement between the steering wheel and a steering gear. In operation the shaft must be slightly rotated before the control assembly allows the supplementary steering force to be applied. The torsion bar applies a rotational resistance on the shaft which typically requires a certain amount of human input on the steering wheel to move the steering wheel from its current position in order to rotate the shaft and turn on the supplementary steering force. To this extent, once the rotational resistance is overcome by the human input and the shaft is slightly rotated, the supplementary steering force multiplies the human effort making it easier to turn the steering wheel. Generally, these systems measure the amount of torque applied by the human effort and provide correlational force. While these systems provide a significant improvement over steering configurations without power or assist systems, they still ultimately require a certain amount of human input for overcoming the initial rotational resistance of the torsion bar required to activate the supplemental force. This amount of required human input can vary drastically as a result of both the speed at which the automobile travels and the weight carried by the automobile. It is therefore desirable to add additional assistance to reduce or completely eliminate the human input required for overcoming sometimes inconsistent rotational resistances in order to initiate the supplementary steering force. Moreover, in applications where steering is autonomous and human effort is unneeded or unwanted, applications which bypass the human element are particularly advantageous. It is thus necessary to further advance the art which has traditionally required a certain amount of human input before application of supplementary steering force.

SUMMARY OF THE INVENTION

The subject invention provides a control assembly for power steering in an automobile which comprises a valve assembly that includes a valve sleeve defining a cavity and a shaft that extends through the cavity. The shaft is rotatable on an axis of rotation relative to the valve sleeve in a first rotational direction and a second rotational direction. When installed in an automobile, the shaft extends from a torsion bar and for conveying rotational movement between a steering column and a steering gear. The valve assembly includes a first hydraulic circuit interchangeable from an unassisted condition to an assisted condition. In the unassisted condition, the torsion bar applies a rotational resistance that prevents rotation of the shaft and corresponding turning of a driving wheel. The shaft must be slightly rotated to switch to the assisted condition wherein the first hydraulic circuit hydraulically actuates steering of the automobile. More particularly, the shaft must be rotated in either the first or second rotational directions a circumferential actuating distance. The hydraulic actuation assists in steering the automobile via a hydraulic pressure cylinder in a direction dependent upon the rotation of the shaft. In other words, first hydraulic circuit applies the force required to convey rotational movement between the steering column and a steering gear once the shaft is slightly rotated. The control assembly further includes an actuator having a second hydraulic circuit that is interchangeable from an unengaged condition to an engaged condition to apply a circumferential hydraulic force on the shaft that overcomes the rotational resistance of the torsion bar to rotate the shaft in either the first or the second rotational direction the circumferential actuating distance. As a result of the rotational movement of the shaft, the first hydraulic circuit actuates the hydraulic pressure cylinder thereby supplying the supplemental steering force of the assisted condition thus modulating and possibly eliminating the requirement of human input. In the unengaged condition, the second hydraulic circuit does not apply hydraulic force on the shaft and thus the control assembly is free to operate in a traditional manner.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENT

Example embodiments will now be described more fully with reference to the accompanying drawings. In general, the subject embodiments are directed to a control assembly for power steering. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the several views, a control assembly 20 in accordance with the subject disclosure is intended for overcoming a rotational resistance associated with conventional power steering systems, namely the rotational resistance required to activate supplementary steering force. This supplementary steering force often times only available when a steering wheel is in a non-rotated position.

Generally referring to FIGS. 1-11, the control assembly 20 provides a valve assembly 22 that includes a valve sleeve 24 defining a cavity 52 and a shaft 26 disposed on an axis of rotation A. The shaft 26 is disposed in and extends axially through the cavity 52 and is rotatable relative to the valve sleeve 24 from a non-rotated position in a first rotational direction 30 and a second rotational direction 32, i.e., clockwise and counterclockwise. When installed in an automobile, the shaft 26 extends from a torsion bar 62 and conveys rotational movement between a steering column and a steering gear. The torsion bar 62 applies a rotational resistance on the shaft 26 preventing rotation until application of torque force which has traditionally required human input via turning of a steering wheel.

The valve assembly 22 includes first hydraulic circuit 76 interchangeable from an unassisted condition 36 to an assisted condition 34. In the unassisted condition 36, the shaft 26 is subject to the rotational resistance from the torsion bar 62 which prevents rotation of the shaft 26. This rotational resistance is traditionally overcome by a driver turning a steering wheel. Once the rotational resistance of the shaft 26 is overcome, the first hydraulic circuit 76 changes to the assisted condition 34, wherein the first hydraulic circuit 76 hydraulically actuates steering of the automobile via a hydraulic pressure cylinder 64. To overcome the rotational resistance of the torsion bar 62, the shaft 26 is rotated in either the first or second rotational directions 30, 32 a circumferential actuating distance D from the non-rotated position or current position of the steering wheel. The non-rotated position of the shaft 26 can be associated with a non-rotated position of a steering wheel. Thus, once the shaft 26 is rotated, the assisted condition 34 provides supplementary steering force which eases or eliminates the effort required to convey rotational movement from the steering wheel and steering column to a steering gear in order to steer the automobile. To modulate or possibly eliminate the human input requirement to overcome the rotational resistance, the valve assembly 22 includes an actuator 38 that overcomes the rotational resistance of the torsion bar 62. To accomplish overcoming the rotational resistance, the actuator 38 includes a second hydraulic circuit 86 that is interchangeable from an unengaged condition 42 to an engaged condition 40 that overcomes the rotational resistance of the torsion bar 62 in the unassisted condition 36 by applying circumferential hydraulic force on the shaft 26. The circumferential hydraulic force rotates the shaft 26 in either the first or second rotational directions 30, 32 (i.e., clockwise or counterclockwise) the circumferential actuating distance D thereby initiating the assisted condition 34. In the unengaged condition 42, the second hydraulic circuit 86 does not affect the shaft 26.

Figure 3A:
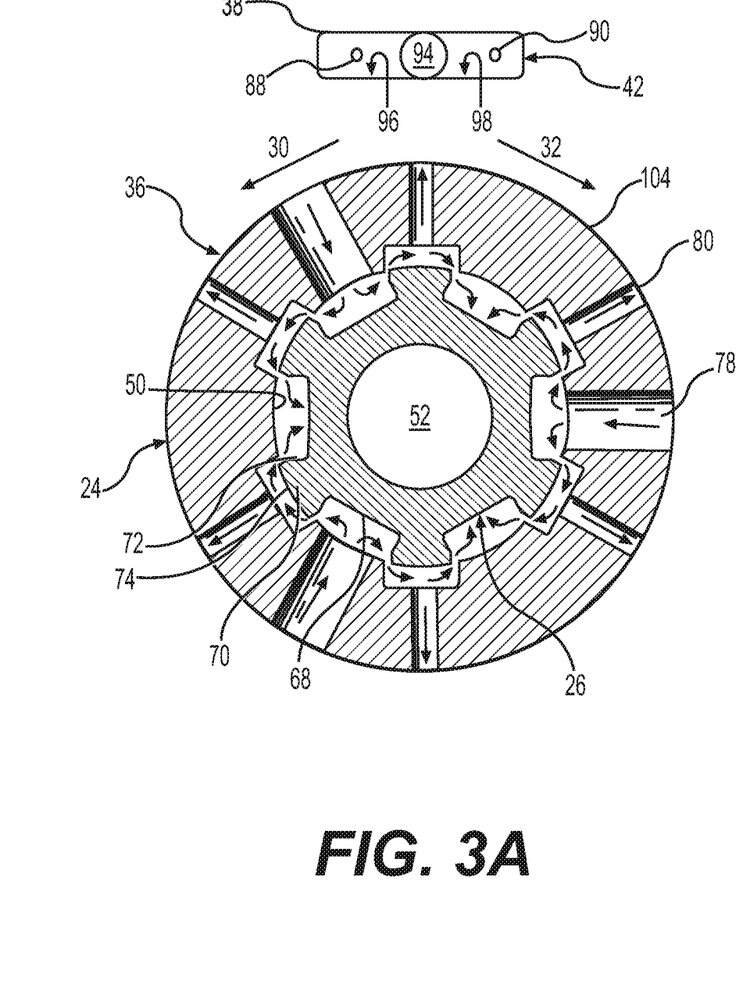
FIG. 3A is a sectional view taken along line "AA" of FIG. 1 illustrating the valve assembly in an unassisted condition and an actuator in an unengaged condition.
Figure 3B:
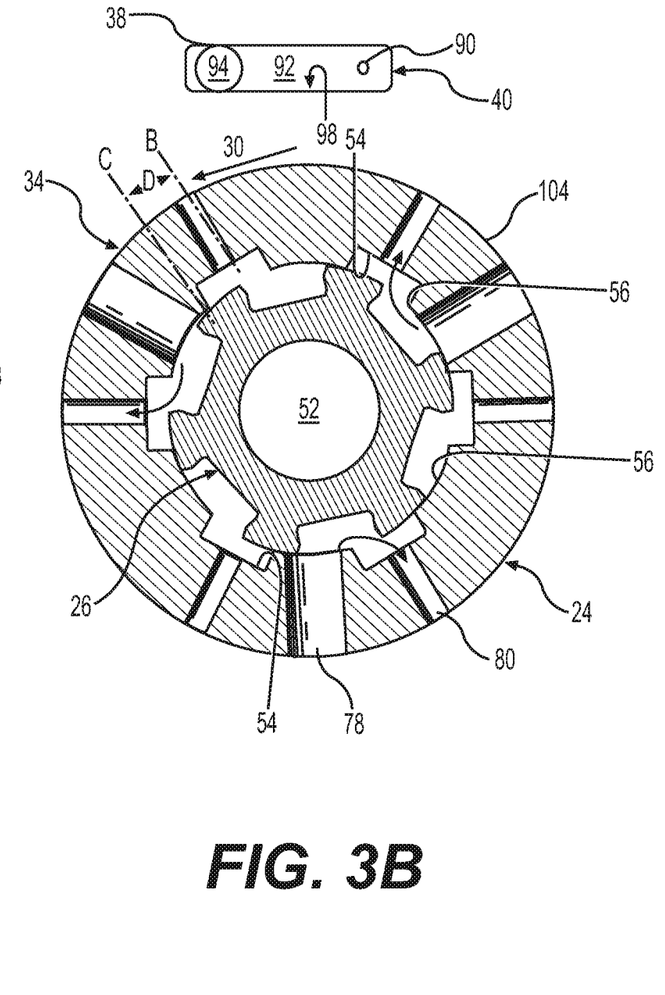
FIG. 3B is a sectional view taken along line "AA" of FIG. 1 illustrating the valve assembly in an assisted condition and the actuator in an engaged condition.

As best illustrated in FIGS. 3A and 3B, the valve sleeve 24 includes a wall 44 extending in a parallel relationship to the axis of rotation A between a first end 46 and a second end 48. The wall 44 of the valve sleeve 24 includes an interior surface 50 outlining the cavity 52 and defining a plurality of slots 54 circumferentially spaced apart by ribs 56. The slots 54 each extend in a parallel relationship to the axis of rotation A and expand radially outwardly from the interior surface 50. Each of these slots 54 includes a slot center axis B and the slots 54 extend symmetrically from the slot center axis B.

The shaft 26 extends along the axis of rotation A between an input end 58 and an output end 60. The shaft 26 is disposed through the cavity 52 with the input end 58 extending axially outwardly from the first end 46 of the valve sleeve 24 and the output end 60 extending axially outwardly from the second end 48 of the valve sleeve 24. The torsion bar 62 is in communication with a drive column and extends from the input end 58 of the shaft 26 communicating rotational input from the drive column. As best illustrated in FIGS. 3A and 3B, the shaft 26 defines an exterior shaft surface 66 having a circular cross-section defining a plurality of notches 68 circumferentially spaced apart by guides 70 adjacent to the output end 60. The notches 68 each extend about the axis of rotation A and expand radially inwardly. The guides 70 include guide side walls 72 that extend radially outwardly from the notches 68 to a guide top surface 74. Each of the guide top surfaces 74 include a top surface central axis C and each of the guide top surfaces 74 extend symmetrically from the top surface central axis C.

As illustrated in FIG. 3A, each of the top surface central axes C of the shaft 26 are disposed in circumferential alignment with a respective one of the slot central axis B in the unassisted condition 36. As illustrated in FIG. 3B, each of the top surface central axes B are circumferentially spaced from respective one of the slot central axis C in the first rotational direction 30 or the second rotational direction 32 the circumferential actuating distance D in the assisted condition 34 as a result of being urged by the actuator 38.

Figure 10:
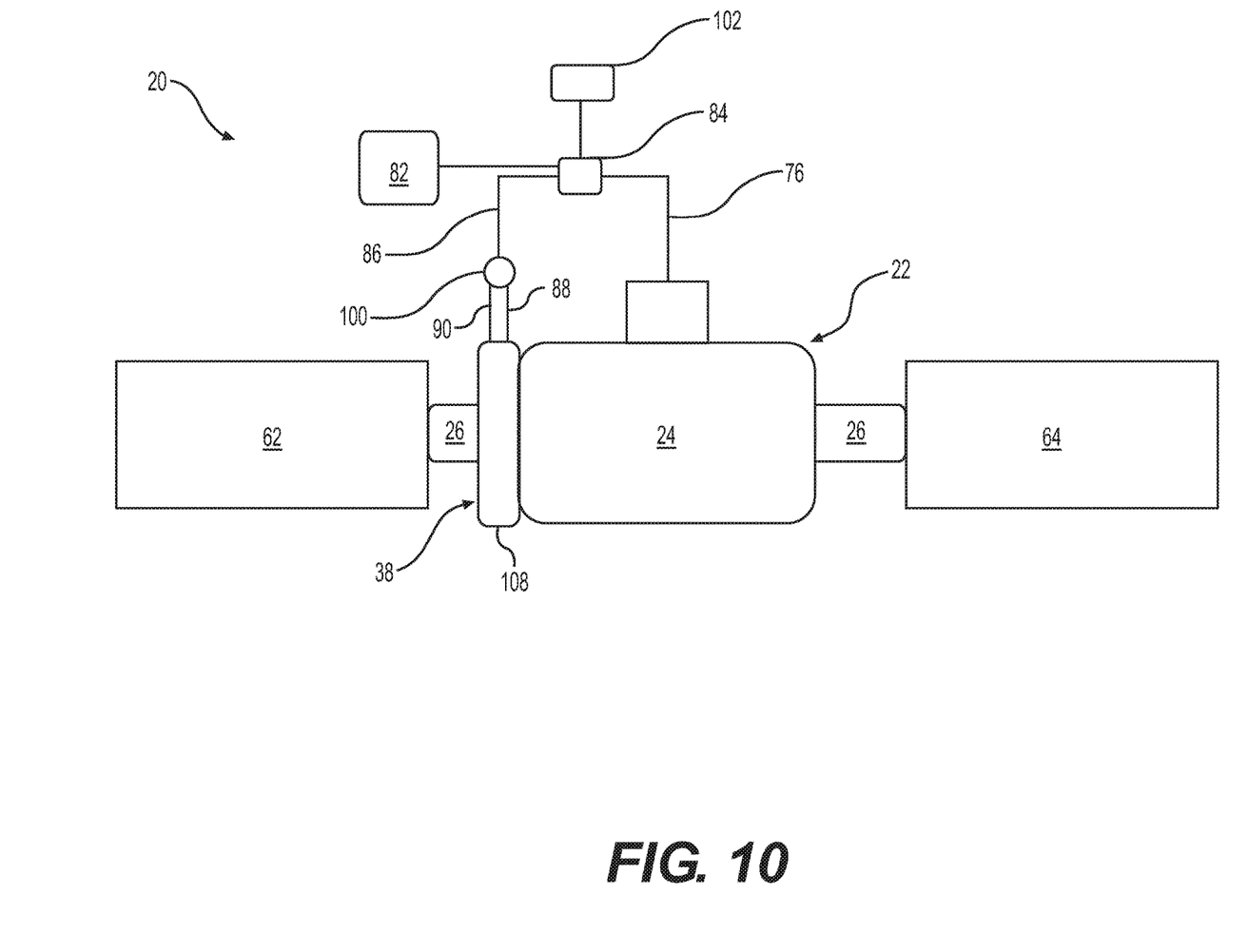
FIG. 10 is a schematic view of a control assembly with a first hydraulic circuit and a second hydraulic circuit in fluid communication in accordance with one arrangement of the subject disclosure.
Figure 11:
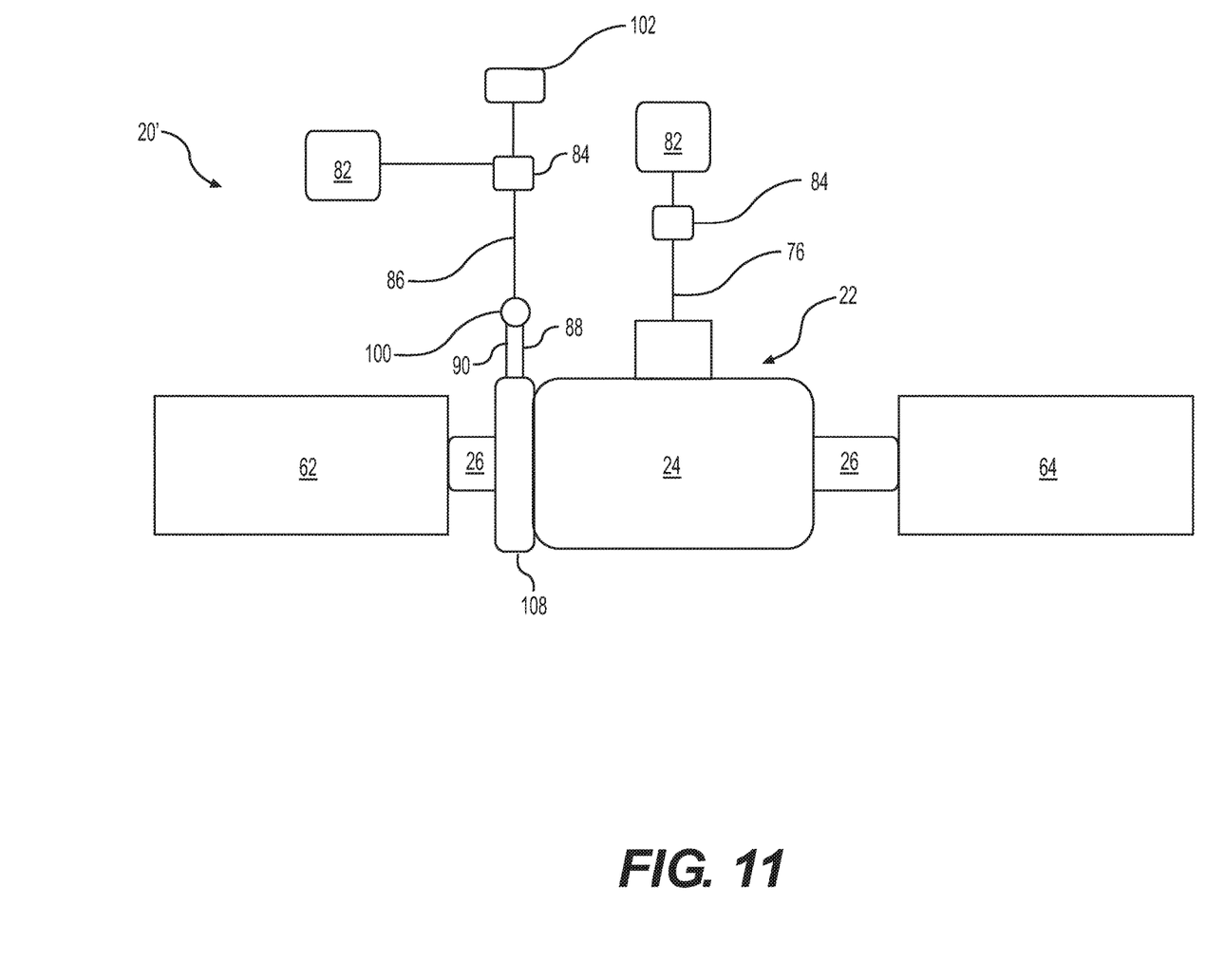
FIG. 11 is a schematic view of the control assembly with a separated first hydraulic circuit and second hydraulic circuit in accordance with another arrangement of the subject disclosure.

Still referring to FIGS. 3A and 3B, the first hydraulic circuit 76 includes a plurality of input assist channels 78 each extending through the wall 44 and one of the ribs 56 of the valve sleeve 24. The first hydraulic circuit 76 further includes a plurality of output assist channels 80 with each one of the output assist channels 80 extending through the wall 44 from one of the slots 54 of the valve sleeve 24. In the unassisted condition illustrated in FIG. 3A, hydraulic fluid flows freely through all of the output assist channels 80 and thus the hydraulic pressure cylinder 64 is unaffected. However, as seen in FIG. 3B depending on which direction the shaft 26 is rotated, only select output assist channels 80 may convey the hydraulic pressure. FIG. 3B illustrates rotation of the shaft 26 in one extreme circumferential distance, however as this circumferential distance changes, the ratio of hydraulic pressure conveyed between individual output assist channels 80 is metered. The select output assist channels 80 thus convey fluid to the hydraulic pressure cylinder 64 in the assisted condition 34 in a direction dependent on which select output assist channels 80 convey the hydraulic fluid. As best illustrated in FIGS. 10 and 11, the control assembly 20 includes at least one hydraulic fluid source 82 providing fluid to the first hydraulic circuit 76. The control assembly 20 further includes at least one pressure module 84 pressurizing the first hydraulic circuit 76.

The second hydraulic circuit 86 of the actuator 38 includes a first actuator channel 88, a second actuator channel 90, and a hydraulic chamber 92. A pin 94 divides the hydraulic chamber 92 into a first sub-chamber 96 in fluid communication with the first actuator channel 88 and a second sub-chamber 98 in fluid communication with the second actuator channel 90. When one of the first or second sub-chambers 96, 98 is pressurized the pin 94 is urged into the other of the first and second sub-chambers 96, 98. Movement of the pin 94, overcoming the rotational resistance of the torsion bar 62 moves the shaft 26 relative to the valve sleeve 24 the circumferential actuating distance D thus placing the first hydraulic circuit 76 of the valve assembly 22 in the assisted condition 34.

As best illustrated in FIGS. 10 and 11, the second hydraulic circuit 86 is also in fluid communication with the at least one hydraulic fluid source 82 which provides fluid to at least the second hydraulic circuit 86. A three-way valve 100 is in selectable fluid communication between the at least one hydraulic fluid source 82 and the first actuator channel 88 and the second actuator channel 90. The at least one pressure module 84 pressurizes the second hydraulic circuit 86 and directs fluid towards the three-way valve 100 from the at least one hydraulic fluid source 82. An electric control unit 102 is in electric communication with the at least one pressure module 84 and the three-way valve 100 for selectively moving the actuator 38 between the engaged condition 40 and the unengaged condition 42.

The wall 44 of the valve sleeve 24 includes an exterior surface 104 having a circular cross-section that defines a plurality of grooves 105 expanding radially inwardly. Each of the input assist channels 78 and each of the output assist channels 80 extend though the exterior surface 104 of the wall 44 of the valve sleeve 24 from one of the grooves 105. A plurality of ring seals 106 are impermeably disposed over and extend at least partially into the grooves 105. In one arrangement illustrated in FIG. 10, the first hydraulic circuit 76 and the second hydraulic circuit 86 of the control assembly 20 are in fluid communication with each other and the at least one pressure module 84 includes only a singular pressure module 84 that pressurizes both of the first hydraulic circuit 76 and the second hydraulic circuit 86. In an alternative arrangement illustrated in FIG. 11, the first hydraulic circuit 76 and the second hydraulic circuit 86 of the control assembly 20' are not in fluid communication with each other and the at least one pressure module 84 includes two pressure modules 84 with one pressure module 84 pressurizing the first hydraulic circuit 76 and the other pressure module 84 pressurizing the second hydraulic circuit 86. In either of these arrangements, the at least one pressure module 84 can include an electric pump.

Figure 1:
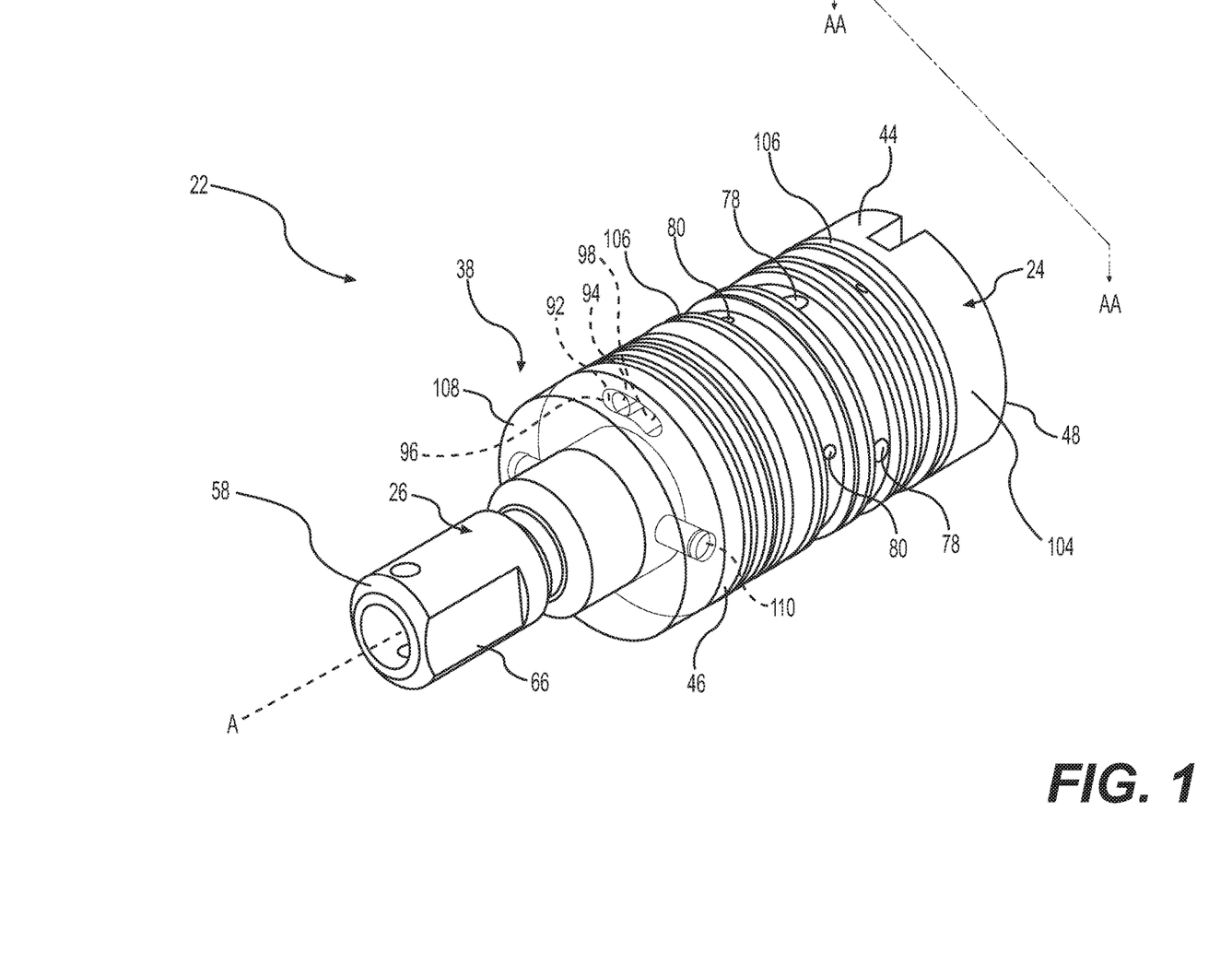
FIG. 1 is a perspective view of a valve assembly in accordance with a first embodiment of the subject disclosure.
Figure 2:
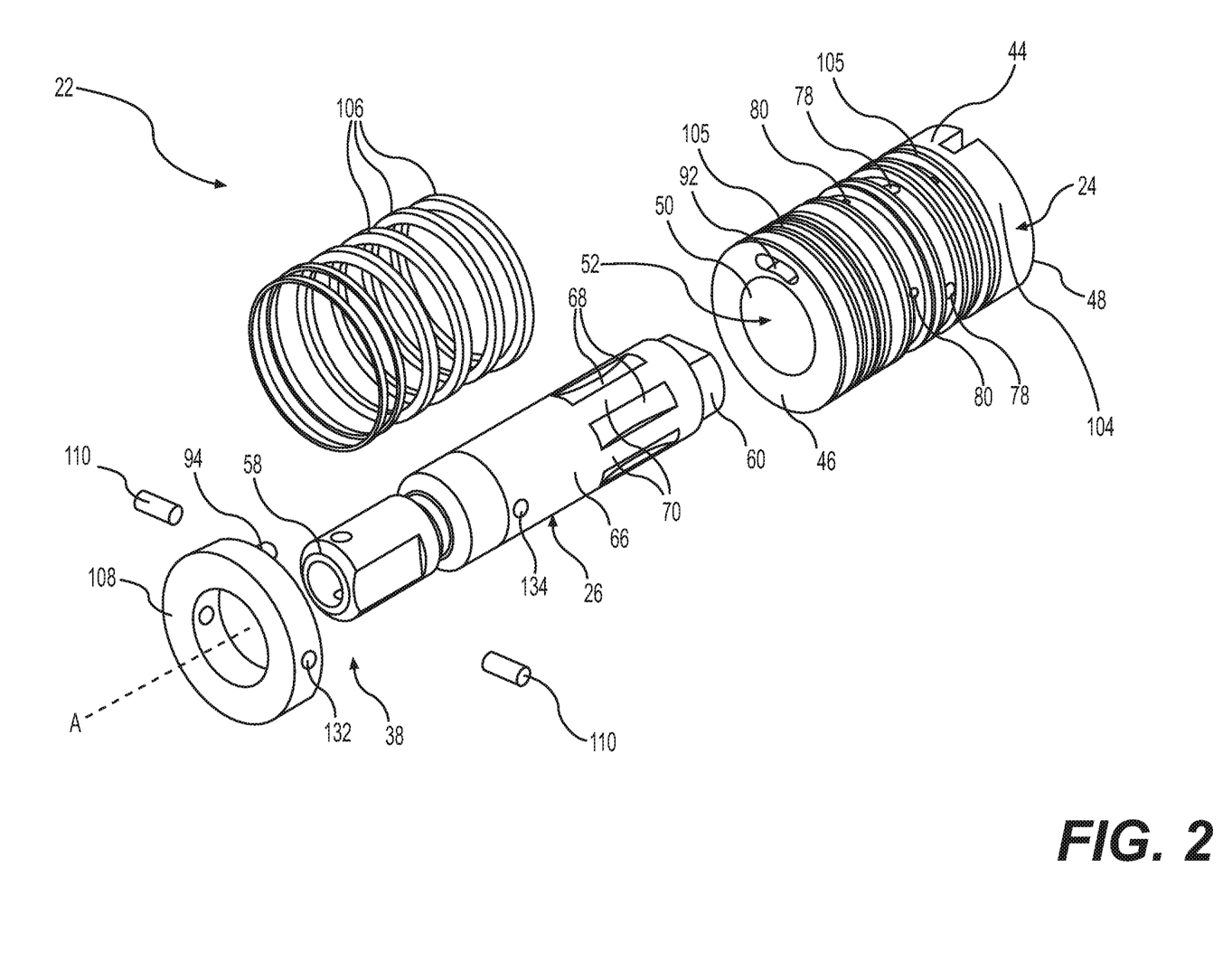
FIG. 2 is an exploded view of the valve assembly illustrating a valve sleeve and a shaft.

Referring now specifically to the embodiment illustrated in FIGS. 1 and 2, the actuator 38 of valve assembly 22 includes a control sleeve 108 having an annular shape attached to the shaft 26 for conjoint rotation with the shaft 26. The control sleeve 108 includes an at least one control sleeve aperture 132 extending radially inwardly therethrough. The shaft 26 includes at least one shaft aperture 134 extending radially inwardly corresponding to the control sleeve apertures 132. A plurality of fasteners 110 extend through the at least one control sleeve aperture 132 and into at least one shaft aperture 134 for attachment between the shaft 26 and the control sleeve 108. Thus the control sleeve 108 could be incorporated in several existing shafts by way of providing shaft apertures 134. The pin 94 extends axially from the control sleeve 108 and the first end 46 of the valve sleeve 24 defines the hydraulic chamber 92. As such, when assembled the pin 94 extends axially from the control sleeve 108 and into the hydraulic chamber 92 and movement of the pin 94 between sub-chambers 96, 98 moves the control sleeve 108 and shaft 26 relative to the valve assembly 22. The first actuator channel 88 and the second actuator channel 90 are at least partially disposed within the valve sleeve 24 from one of the grooves 105 and extend into respective sub-chambers 96, 98.

Figure 4:
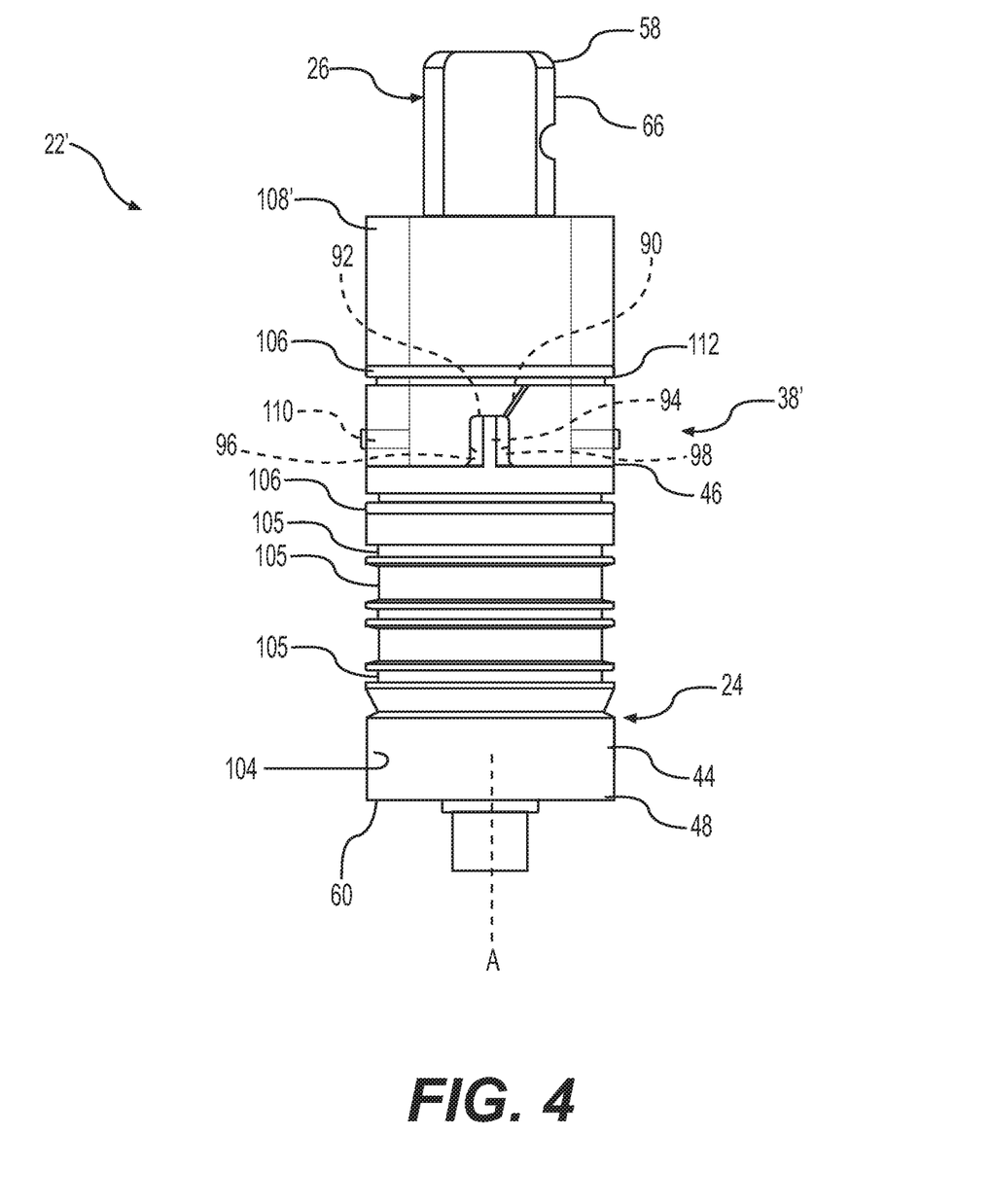
FIG. 4 is a side view of a valve assembly in accordance with a second embodiment of the subject disclosure.
Figure 5:
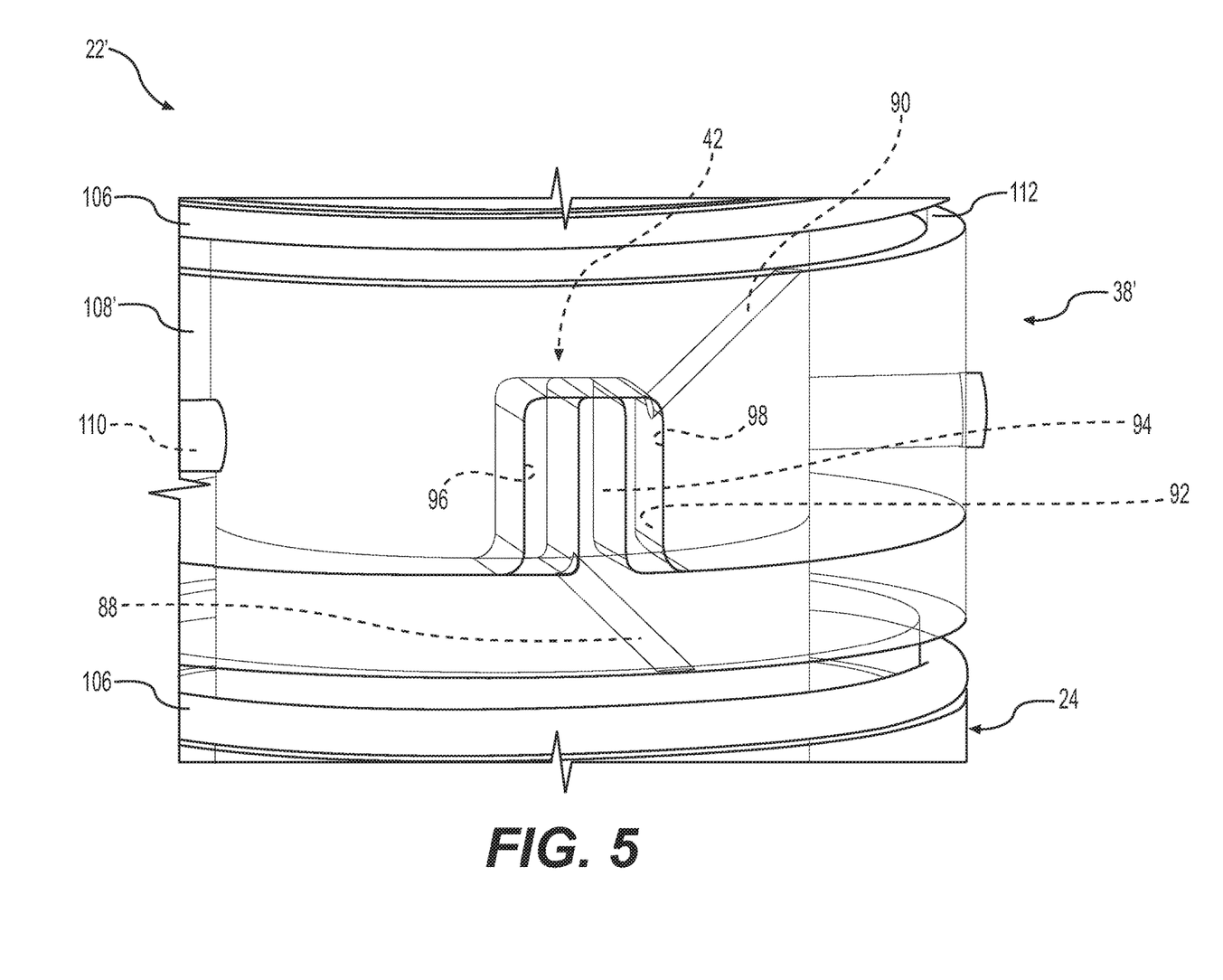
FIG. 5 is a close up of an actuator of the valve sleeve presented in FIG. 4.

With reference to the embodiment illustrated in FIGS. 4 and 5, the actuator 38' of valve assembly 22' includes a control sleeve 108' having an annular shape attached to the shaft 26 for conjoint rotation with the shaft 26. A plurality of fasteners 110 extend through the control sleeve 108' into the shaft 26 for attachment between the shaft 26 and the control sleeve 108' as in the previous embodiment. The control sleeve 108' defines at least one control sleeve groove 112 extending circumferentially about the control sleeve 108'. A ring seal 106 is disposed over and at least partially in the at least one control sleeve groove 112 for sealing the groove 112. In this embodiment, the pin 94 extends axially from the valve sleeve 24 and the control sleeve 108 defines the hydraulic chamber 92. As best illustrated in FIG. 5, the first actuator channel 88 is at least partially disposed in the valve sleeve 24 and the second actuator channel 90 is at least partially disposed within the control sleeve 108 from the control sleeve groove 112 for providing fluid to respective sub-chambers 96, 98.

Figure 6:
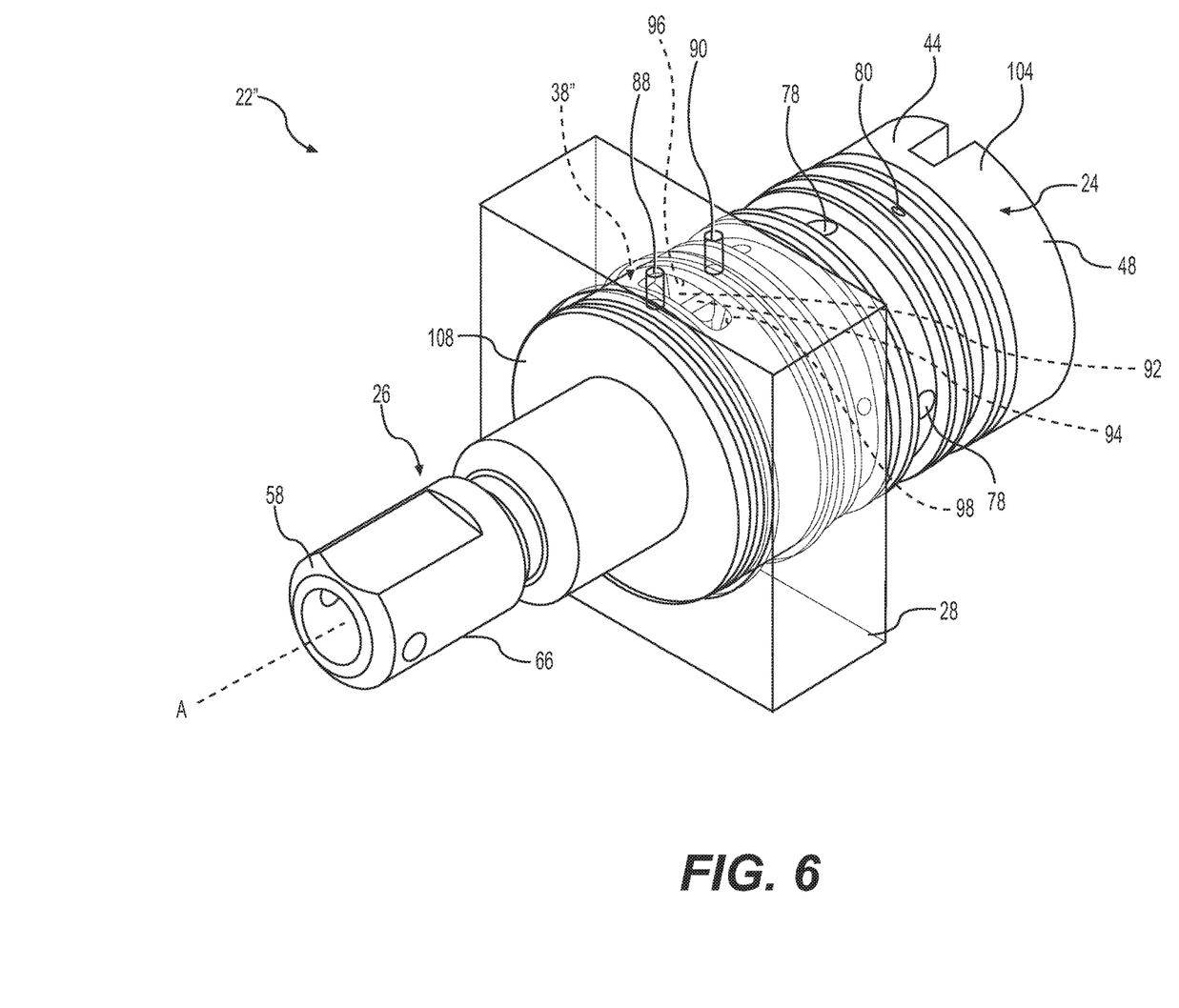
FIG. 6 is a perspective view of a valve assembly in accordance with a third embodiment of the subject disclosure.
Figure 7:
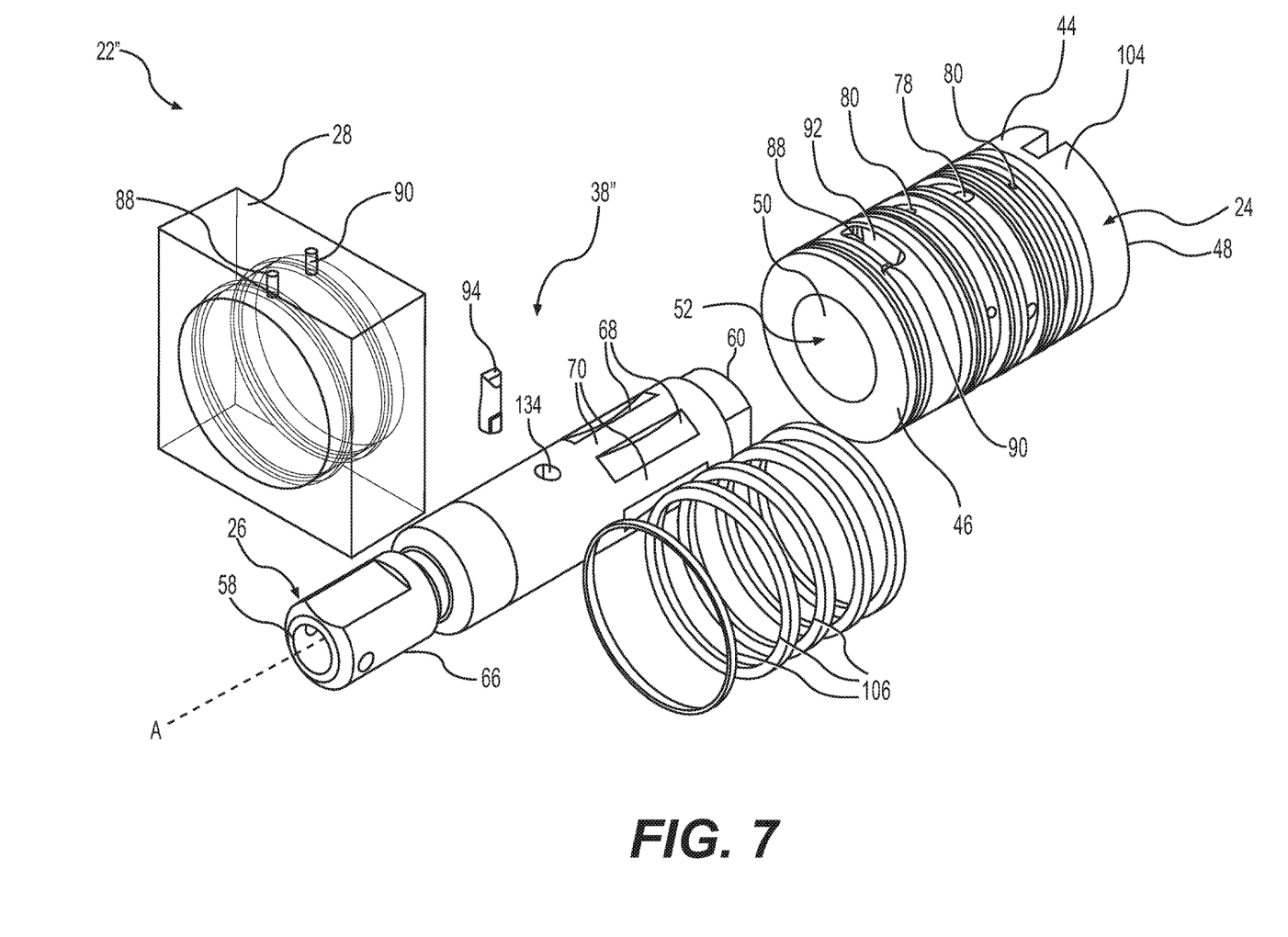
FIG. 7 is an exploded view of the valve sleeve presented in FIG. 6 illustrating the components of the valve assembly.

Looking to the embodiment illustrated in FIGS. 6 and 7, the actuator 38" of valve assembly 22" is now assembled such that the pin 94 is disposed on the shaft 26 and extends radially outwardly. The interior wall 44 of the valve sleeve 24 defines the hydraulic chamber 92. A housing 28 surrounds the valve sleeve 24 over the hydraulic chamber 92 for providing hydraulic fluid therein. Accordingly, the pin 94 is aligned with the hydraulic chamber 92 and extends radially outwardly into the hydraulic chamber 92. The first actuator channel 88 and the second actuator channel 90 are both at least partially disposed within the valve sleeve 24 from one of the grooves 105 and a housing 28 for providing fluid to respective sub-chambers 96, 98.

Figure 8:
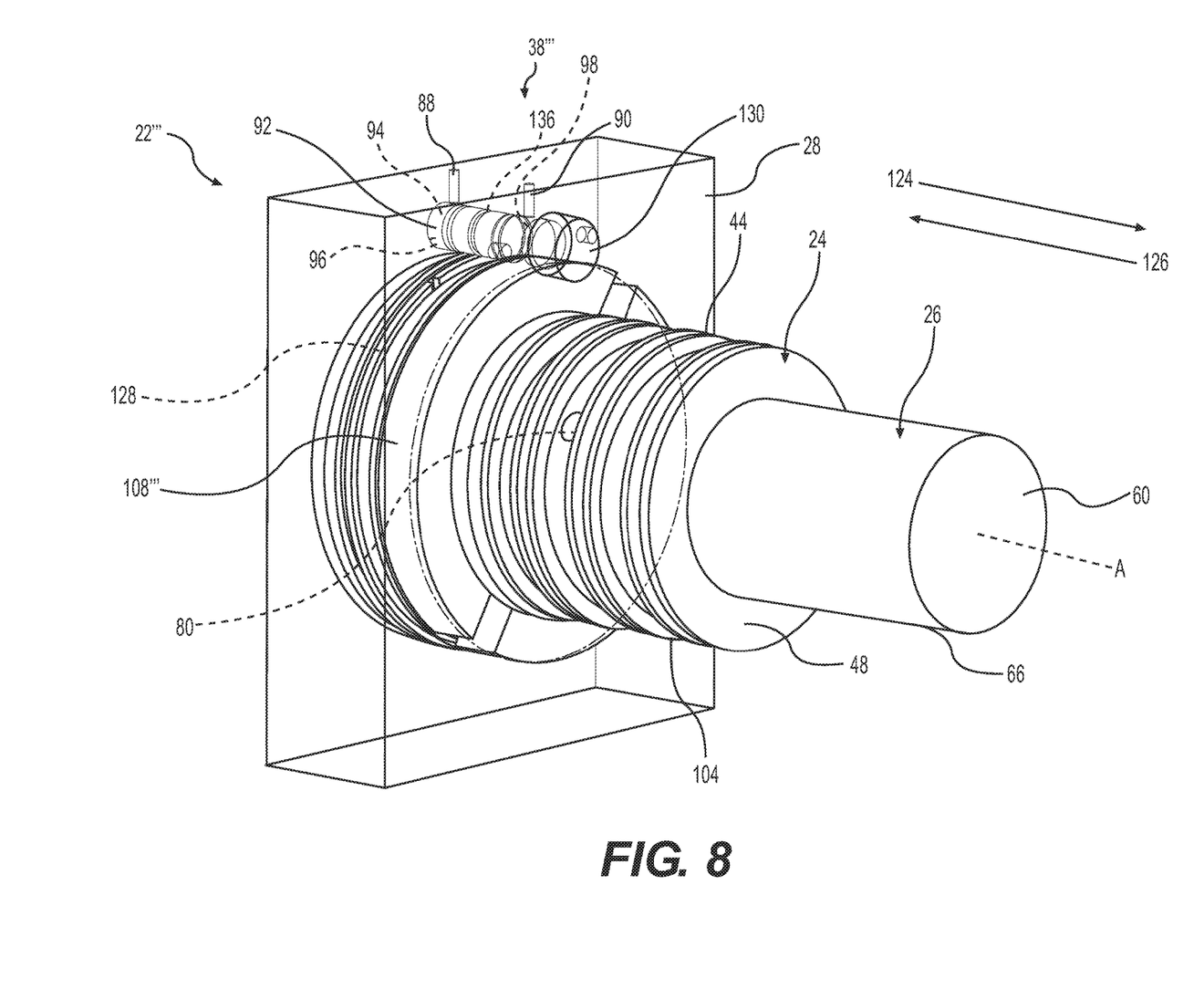
FIG. 8 is a perspective view a valve sleeve in accordance with a fourth embodiment of the subject disclosure.
Figure 9:
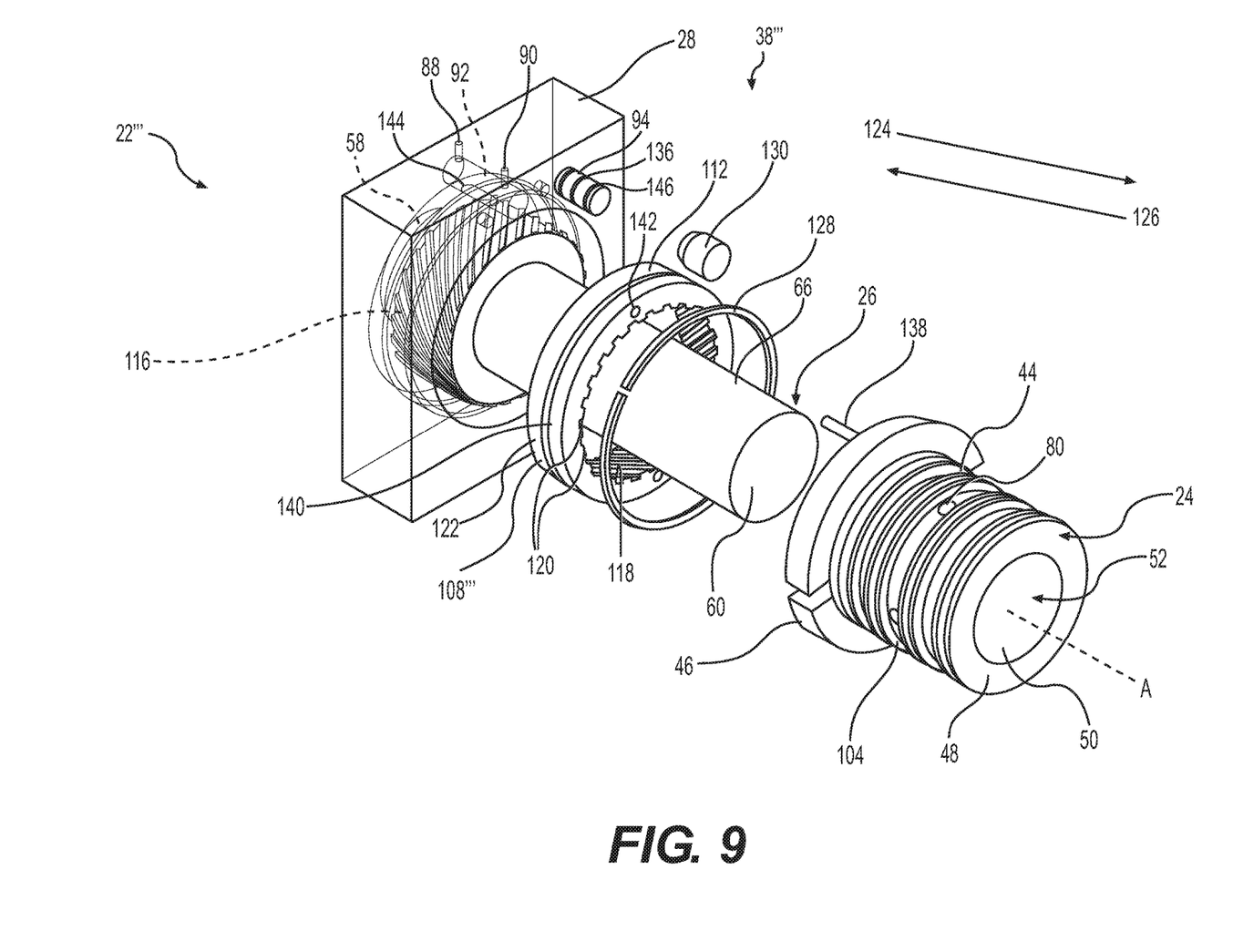
FIG. 9 is an exploded view of the valve assembly presented in FIG. 8 illustrating a shaft and a control sleeve each having helical teeth.

Referring to the embodiment illustrated in FIGS. 8 and 9, the actuator 38''' of the valve assembly 22''' includes the input side of the shaft 26 defining a plurality of helical teeth 116 extending helically about the axis of rotation A. A control sleeve 108''' having an annular shape includes an interior control sleeve surface 118 that defines a plurality of driving teeth 120 engaged with the helical teeth 116. The control sleeve 108''' further includes an outer control sleeve surface 122 defining a control sleeve guide 140 extending circumferentially around the control sleeve 108'''. The pin 94 defines a pin guide 136 that corresponds with the control sleeve guide 140 and extends circumferentially around the pin 94. The pin 94 is disposed in a spaced relationship from the control sleeve 108 and extends in a parallel relationship to the axis of rotation A.

Still referring to the embodiment illustrated in FIGS. 8 and 9, the housing 28 surrounds the control sleeve 108 and defines the hydraulic chamber 92 that defines a passage 144 which extends radially inwardly between the hydraulic chamber 92 and the control sleeve 108 thus exposing the control sleeve 108 to the pin 94 disposed in the hydraulic chamber 92. A spring ring 128 defines an annular shape disposed within the control sleeve guide 140 that extends through the passage 144 into the pin guide 136 for connecting the pin 94 and the control sleeve 108 for conjoint axial movement. During axial movement, the control sleeve 108 is free to rotate with respect to the pin 94. The pin 94 includes pin seals 146 disposed on either side of the pin guide 136 for preventing hydraulic fluid from exiting the passage 144 form the hydraulic chamber 92. The control sleeve 108 moves axially along the axis of rotation A in a first axial direction 124 and a second axial direction 126 in response to pressure accumulating in the first and second hydraulic sub-chambers 96, 98. The axial movement of the shaft 26 rotationally drives the driving teeth 120 which results in corresponding rotation of the shaft 26. The resulting rotation of the shaft 26 is in the first rotational direction 30 and the second rotational direction 32 relative to the first axial direction 124 and the second axial direction 126, respectively. Once the rotation in either rotational direction 30, 32 equals the circumferential actuating distance D, the actuator 38''' is in the engaged condition 40. A hydraulic chamber plug 130 allows installation of the pin 94 and impermeably seals the hydraulic chamber 92. The valve sleeve 24 defines a dowel 138 and the control sleeve 108 defines a dowel hole 142 which engages with one another resulting in conjoint rotational movement between the valve sleeve 24 and the control sleeve 108. As such, axial movement of the pin 94 rotates the control sleeve 108 and the valve sleeve 24 between the engaged position 40 and the unengaged position 42. The first actuator channel 88 and the second actuator channel 90 are at least partially disposed within the housing 28 for providing fluid to respective sub-chambers 96, 98.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A valve assembly for a power steering system conveying an input between a torsion bar and a steering gear comprising:
   a valve sleeve defining a cavity;
   a shaft extending through said cavity and being rotatable relative to said valve sleeve about an axis in a first rotational direction and a second rotational direction;
   a first hydraulic circuit interchangeable from an unassisted condition to an assisted condition in response to said shaft being rotated in either said first or second rotational directions a circumferential actuating distance to hydraulically actuate the steering gear;
   an actuator including a second hydraulic circuit interchangeable from an unengaged condition to an engaged condition to apply a circumferential hydraulic force on said shaft to overcome a rotational resistance of the torsion bar and effectuate rotation of said shaft said circumferential actuating distance in either of said first or said second rotational directions for initiating said assisted condition of said first hydraulic circuit;
   said second hydraulic circuit including a hydraulic chamber; and
   said actuator including a pin dividing said hydraulic chamber into a first sub-chamber and a second sub-chamber;
   wherein a hydraulic pressure applied in said first sub-chamber urges said pin towards said second sub-chamber to rotate said shaft relative to said valve sleeve in said first rotational direction said circumferential actuating distance to initiate said assisted condition; and
   wherein a hydraulic pressure applied in said second sub-chamber urges said pin towards said first sub-chamber to rotate said shaft relative to said valve sleeve in said second rotational direction said circumferential actuating distance to initiate said assisted condition.

2. The valve assembly as set forth in claim 1 wherein said second hydraulic circuit includes a first actuator channel disposed in fluid communication with said first sub-chamber for establishing said hydraulic pressure in said first sub-chamber and urging said pin towards said second sub-chamber and a second actuator channel disposed in fluid communication with said second sub-chamber for establishing said hydraulic pressure in said second sub-chamber and urging said pin towards said first sub-chamber.

3. The valve assembly as set forth in claim 2 wherein said second hydraulic circuit is disposed in fluid communication with a hydraulic fluid source for storing hydraulic fluid and at least one pressure module pressurizing said second hydraulic circuit and a three-way valve disposed between said hydraulic fluid source and said first and second actuator channels.

4. The valve assembly as set forth in claim 2 further comprising:
   said actuator including a control sleeve coupled to said shaft for conjoint rotation with said shaft,
   said valve sleeve extending from a first end disposed adjacent to said control sleeve to a second end,
   said first end of said valve sleeve defining said hydraulic chamber, and
   said pin extending axially from said control sleeve and into said hydraulic chamber.

5. The valve assembly as set forth in claim 4 wherein said control sleeve includes at least one control sleeve aperture extending radially inwardly therethrough and said shaft includes at least one shaft aperture extending radially inwardly and at least one fastener extending through said apertures for establishing the coupled relationship between said shaft and said control sleeve.

6. The valve assembly as set forth in claim 4 wherein said first actuator channel and said second actuator channel being at least partially disposed within said valve sleeve.

7. The valve assembly as set forth in claim 2 further comprising:

said actuator including a control sleeve defining said hydraulic chamber and being coupled to said shaft for conjoint rotation with said shaft, said valve sleeve extending from a first end disposed adjacent to said control sleeve to a second end; and said pin extending axially from said first end of said valve sleeve and into said hydraulic chamber.

8. The valve assembly as set forth in claim 7 wherein said first actuator channel being at least partially disposed in said valve sleeve and said second actuator channel being at least partially disposed within said control sleeve.

9. The valve assembly as set forth in claim 7 wherein said control sleeve defines at least one control sleeve groove extending circumferentially about the control sleeve and said first actuator channel and said second actuator channel each extending from said at least one control sleeve groove to a respective one of said first or second sub-chambers.

10. The valve assembly as set forth in claim 9 further comprising a ring seal disposed over and at least partially in said at least one control sleeve groove for sealing said groove.

11. The valve assembly as set forth in claim 2 wherein said valve sleeve including an interior wall delimiting said cavity and defining said hydraulic chamber and said pin extending radially from said shaft and into said hydraulic chamber.

12. The valve assembly as set forth in claim 11 wherein said first actuator channel and said second actuator channel being at least partially disposed within said valve sleeve.

13. The valve assembly as set forth in claim 11 further comprising a housing surrounding at least part of said valve sleeve and at least partially defining said first actuator channel and said second actuator channel for transferring hydraulic fluid to said valve sleeve.

14. The valve assembly as set forth in claim 2 wherein an input side of said shaft defines a plurality of helical teeth extending helically about said axis of rotation and said actuator includes a control sleeve including an interior control sleeve surface defining a plurality of driving teeth engaged with said helical teeth.

15. The valve assembly as set forth in claim 14 wherein said control sleeve defines a dowel hole and said valve sleeve includes a dowel disposed within said dowel hole for establishing rotational engagement between said valve sleeve and said control sleeve and wherein conjoint axial movement of said pin and said control sleeve rotates said control sleeve and said valve sleeve between said engaged position and said unengaged position.

16. The valve assembly as set forth in claim 14 wherein a housing surrounds said control sleeve and defines said hydraulic chamber including a passage extending radially inwardly from said hydraulic chamber to said control sleeve.

17. The valve assembly as set forth in claim 16 wherein said pin defines a pin guide extending circumferentially around said pin and said control sleeve defines a control sleeve guide extending circumferentially around said control sleeve and said actuator includes a spring ring disposed within said control sleeve guide through said passage and into said pin guide for connecting said pin and said control sleeve for conjoint axial movement while said control sleeve is free to rotate with respect to said pin.

18. The valve assembly as set forth in claim 17 wherein said pin includes pin seals disposed on either side of said pin guide for preventing hydraulic fluid from exiting said passage from said hydraulic chamber.

19. The valve assembly as set forth in claim 17 further comprising a hydraulic chamber plug for allowing installation of said pin and impermeably sealing said hydraulic chamber.

* * * * *